C. A. LINDSTRÖM.
BRAKE ACTUATING MECHANISM.
APPLICATION FILED JUNE 21, 1912.
1,120,152.
Patented Dec. 8, 1914.
3 SHEETS—SHEET 3.
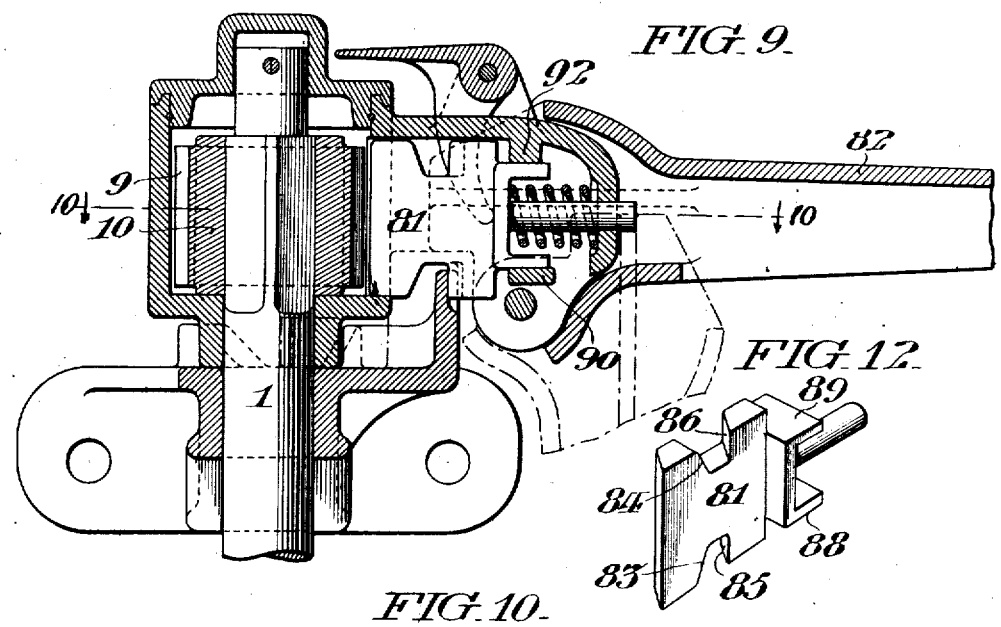
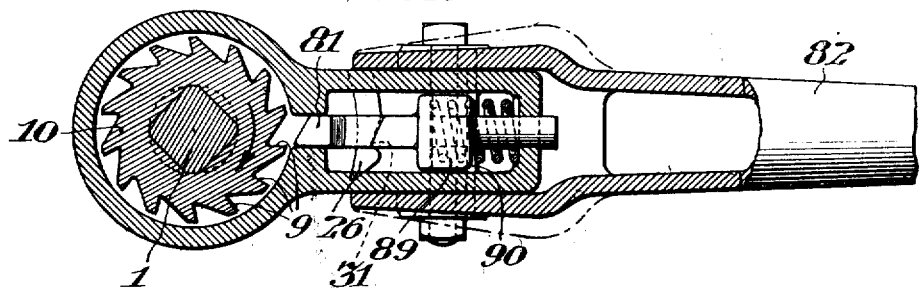
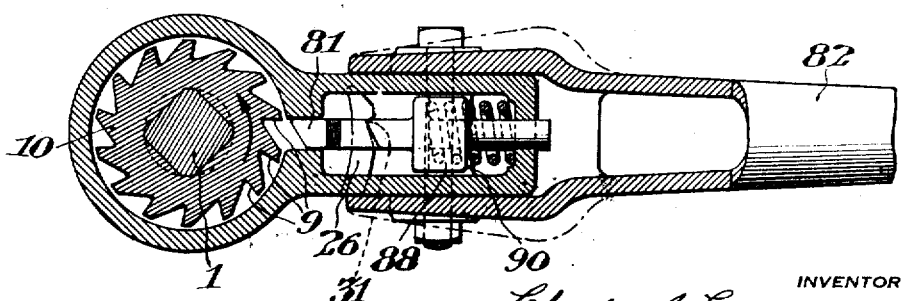

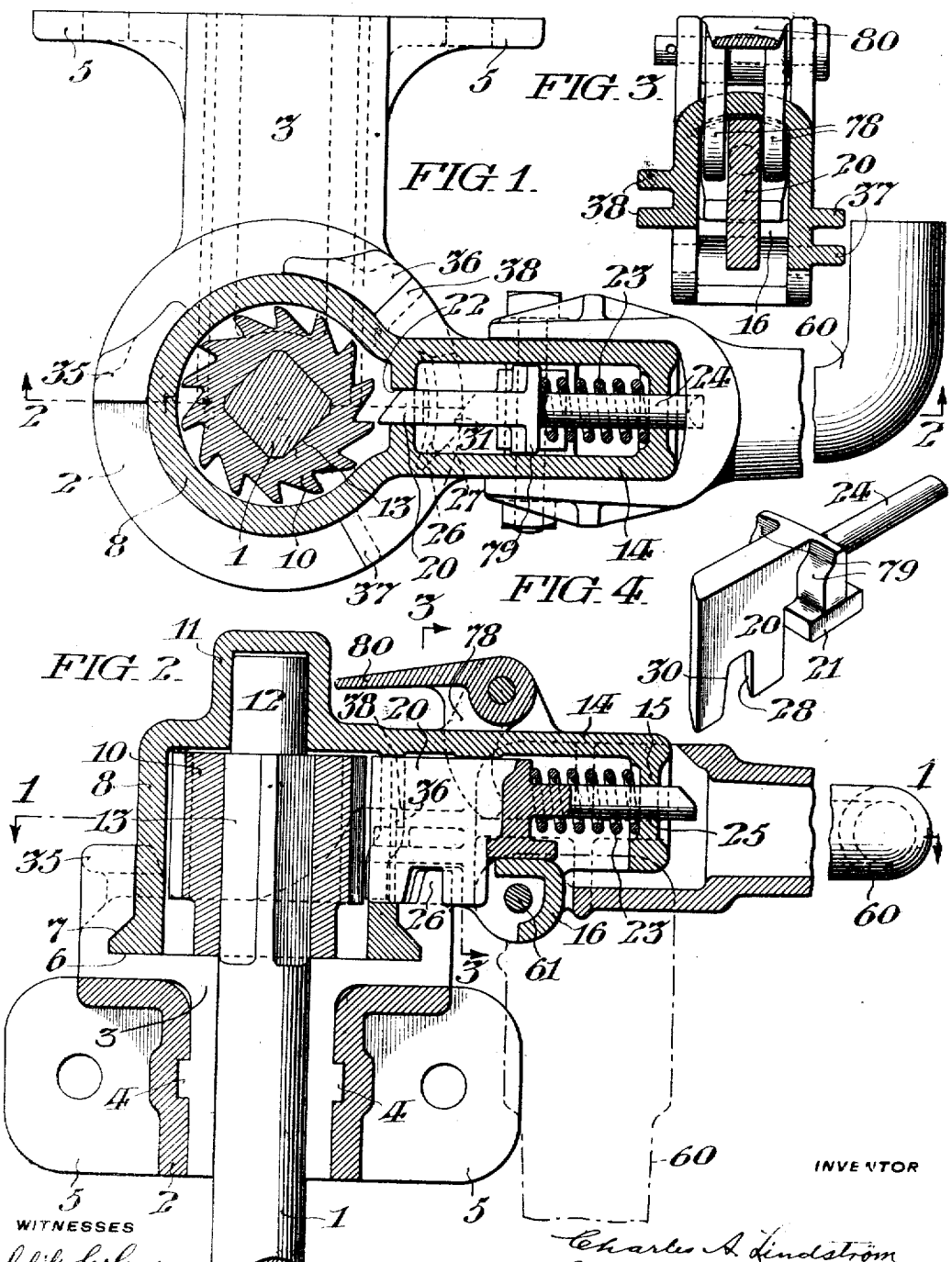

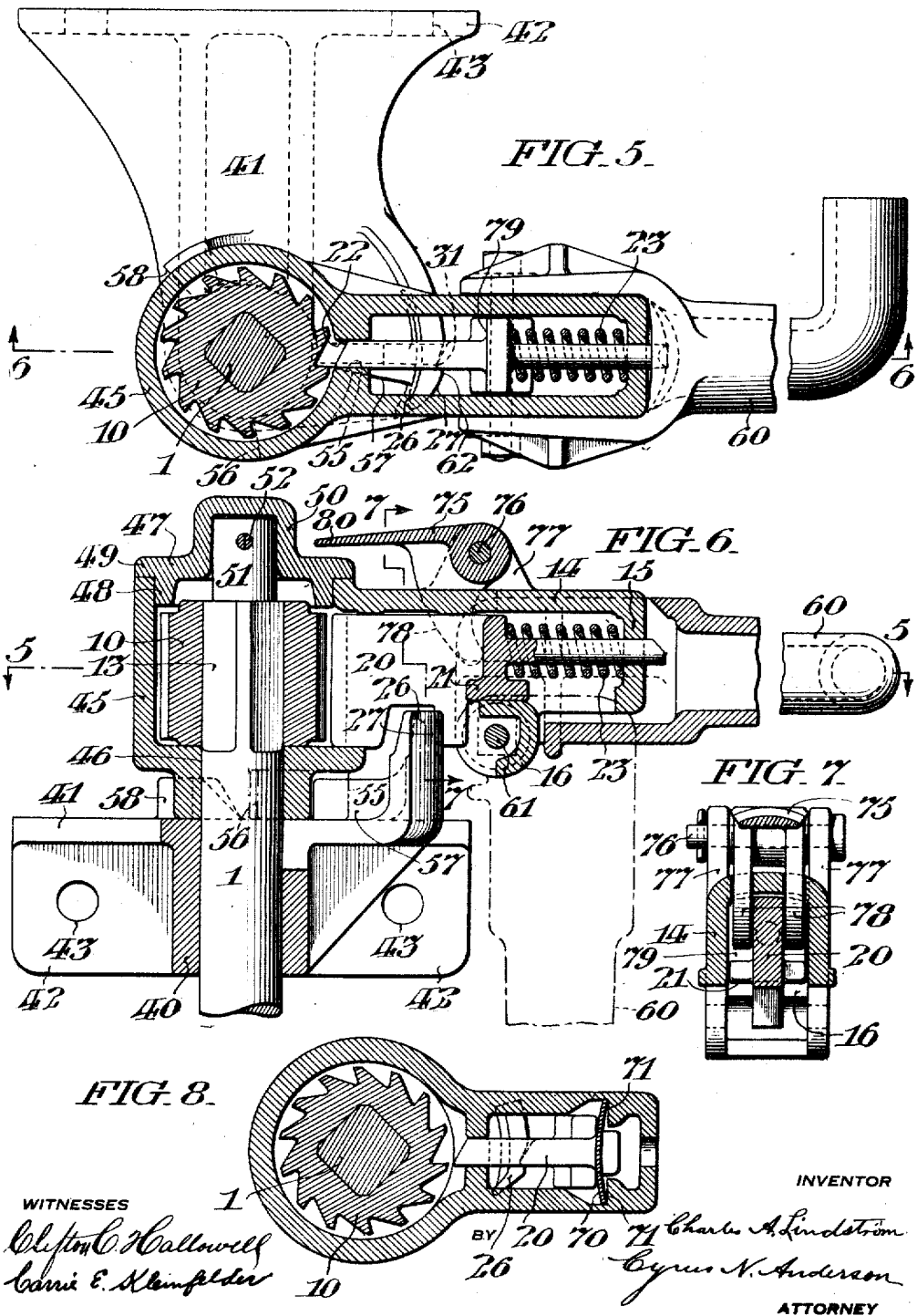

UNITED STATES PATENT OFFICE.

CHARLES A. LINDSTRÖM, OF PITTSBURGH, PENNSYLVANIA, ASSIGNOR TO RATCHET BRAKE COMPANY, OF NEW YORK, N. Y., A CORPORATION OF DELAWARE.

BRAKE-ACTUATING MECHANISM.

1,120,152.   Specification of Letters Patent.   Patented Dec. 8, 1914.

Application filed June 21, 1912. Serial No. 704,993.

*To all whom it may concern:*

Be it known that I, CHARLES A. LINDSTRÖM, a citizen of the United States, residing in Pittsburgh, county of Allegheny, State of Pennsylvania, have invented certain new and useful Improvements in Brake-Actuating Mechanism, of which the following is a specification.

My invention relates to hand brake actuating mechanism of the character in which a drop handle is employed for actuating the brake staff of the mechanism and in which the said handle is operatively connected to the said brake staff through the medium of a clutch or equivalent device and also in which a member of the said clutch is moved automatically into position to render the same inoperative by the action of a device independent of the said handle, and it has for one of its objects to provide means operable at the will of the brakeman or other person for rendering said clutch inoperative whereby at the will of the brakeman the operative connection of the handle with the brake staff may be destroyed.

Other objects and advantages of my invention will be referred to in the detailed description thereof which follows, or will be apparent from such description.

In the accompanying drawings forming a part of my specification I have illustrated convenient forms of embodiments of my invention, but it will be understood that changes in the details of construction within the scope of the claims may be made without departing therefrom.

In the drawings:—Figure 1 is a transverse sectional view taken on the line 1—1 of Fig. 2, certain of the parts of the structure being shown in top plan view; Fig. 2 is a vertical sectional view taken on the line 2—2 of Fig. 1, the upper end of the brake mast being shown in elevation; Fig. 3 is a transverse sectional view taken on the line 3—3 of Fig. 2; Fig. 4 is a perspective view of the pawl shown in the preceding figures of the drawing; Fig. 5 is a transverse sectional view of a modified construction of mechanism taken on the line 5—5 of Fig. 6 certain of the parts of the structure being shown in top plan view; Fig. 6 is a vertical sectional view taken on the line 6—6 of Fig. 5; the upper portion of the brake mast being shown in elevation and the brake handle being indicated by dotted lines in depending inoperative position; Fig. 7 is a transverse sectional view taken on the line 7—7 of Fig. 6; Fig. 8 is a transverse sectional view through the housing which surrounds the ratchet wheel and the projection therefrom which supports the pawl for engaging the said ratchet wheel, showing a modified construction of pawl and of means for holding the same in engagement with the ratchet wheel; Fig. 9 is a vertical sectional view of another modification of my invention wherein the pawl is shown of a construction such that when it is necessary on account of the particular construction of the car to so locate the brake mast that it must be operated from the left instead of from the right, a condition wherein the teeth on the ratchet wheel are in reversed position from that shown in Fig. 1, the said pawl is simply turned upside down; Fig. 10 is a transverse sectional view taken on the line 10—10 of Fig. 9, showing the coöperative parts disposed to turn the brake staff toward the right or clockwise; Fig. 11 is a view similar to that shown in Fig. 10, but showing the coöperative parts disposed to turn the brake staff toward the left or anti-clockwise; and Fig. 12 is a perspective view of the pawl shown in Figs. 9, 10 and 11.

In the drawings, 1 designates the brake staff the upper end of which is supported in a bearing of any desired construction.

Referring to Figs. 1 and 2 the bearing in this instance consists of the members 2 and 3, the member 3 of which is provided with a portion which fits more or less closely into an opening of corresponding shape in the member 2 of the bearing. The said portion of the member 3 is provided with ribs or projections 4 which fit into recesses or grooves of corresponding shape in the opposite side of the opening in the member 2 of the bearing. After the part 3 of the bearing is inserted in position in the opening or recess therefor formed in the member 2 the said bearing is secured to the side of a car or other support by means of the flanges 5 formed at the inner end of the said bearing member 2. The upper portion of the member 3 overlaps the upper side of the member 2, such overlapping portion extending to a line or plane coincident with the axis of the bearing opening. The upper edge of the bearing member 3 is provided with a flange having a groove formed by the flat side 6 and the angular side 7. The complemental part of this groove is formed in a corresponding flange upon the upper outer edge of the member 2 of the bearing. The housing 8 which surrounds the ratchet wheel 10 is secured in position upon the bearing 2—3 by means of a flange formed upon the outer side of the lower edge of a shape corresponding to the angular groove formed in the upper edges of the bearing members 2—3. It will be understood that in assembling the parts the ratchet wheel 10 should be placed within the housing 8 and the latter with the said ratchet wheel being thereafter placed in proper position with respect to the member 2 of the bearing after which the member 3 may be placed in proper position with respect to the member 2. The bracket may then be attached to a support by any proper means extending through the flanges 5. The brake mast 1 may be inserted in position with its upper end extending through the ratchet wheel either before or after the parts are assembled as above described. The housing 8 is provided with a hollow projection 11 into which projects a reduced end 12 of the brake mast 1. The upper end portion of the brake mast is squared as indicated at 13 to fit the correspondingly shaped opening through the ratchet wheel 10. The housing 8 is provided with a laterally extending projection 14 which is hollow, as clearly indicated, and the outer end of which is closed as indicated at 15. The said projection 14 is provided with a cross piece 16 extending between its opposite sides which serves not only to strengthen the said projection 14 but also as a support and guide for the pawl 20, the bearing portions 21 of which rest upon the upper side of the said cross piece 16. The said pawl projects through an opening 22 in the side of the housing 8 which opening is centrally located with respect to the projection 14 from the housing and is consequently in alinement therewith. The pawl, as is clearly indicated in Fig. 1 of the drawings, is adapted to engage with the teeth on the ratchet wheel 10, and for the purpose of causing the said pawl to move forward into engagement with the said teeth when it is permitted to do so, I have provided the coiled spring 23 which is coiled around a stem 24 extended outwardly from the body portion of the pawl 20, which stem extends through and is supported upon the edges of an opening 25 in the end 15 of the projection 14. The outer end of the spring 23 is seated against the end 15 of the said projection and the inner end thereof is seated against the outer end of the body part of the pawl, and by reason of the fact that the said spring is held under compression it tends constantly to cause movement of the said pawl inwardly to engage the teeth of the ratchet wheel 10. As a means for retracting the pawl 20 to disengage the same from the ratchet teeth of the ratchet wheel 10 I have provided a pawl retracting device or detent 26 consisting of a lug projecting upwardly from the members 2 and 3 of the bearing structure. The outer side of one end portion of the pawl retracting device 26 is beveled as indicated at 27 in Fig. 1 which beveled side engages the beveled edge 28 of a slot 30 formed in the lower edge of the pawl 20. The portion of the said pawl at the outer side of the said slot 30 is adapted to engage with a notch 31 in the said pawl retracting device 26. The movement of rotation of the housing 8 and the parts having connection therewith is limited by means of the stop lugs 35 and 36 which are formed upon the member 3 of the bearing. These stop lugs are adapted to coact with stop lugs 37 and 38 upon the housing structure. It will be observed that when the housing structure is in its normal position of rest (which may be termed its initial position) with the pawl 20 held out of engagement with the teeth of the ratchet wheel 10 the stop lug 38 is in contact with the stop lug 36. Movement of the housing and its associated parts in an angular direction away from its initial position and away from the stop lug 36 is limited by contact of the lug 37 with the lug 35. It is necessary that the stop lug 38 travel over the retracting device 26 and in order that it may contact with the lug 36 the latter is extended to a height substantially greater than the height of the retracting device 26, the stop lug 38 contacting with the upper end portion of the said lug 36.

Referring to Figs. 5 to 7 inclusive, it will be noted that while the structure is in a general way quite similar it differs from that illustrated in Figs. 1 to 4 inclusive in a number of details. In said Figs. 5 to 7 the bearing 40 for the brake staff 1 is formed at the outer end of and is integral with the bracket like member 41 having flanges 42 provided with openings 43 by means of which the said member is secured to some part of the car structure. In certain classes of cars the bearing bracket would be supported upon a side or end of the body of the car while in other classes of cars, as, for instance, ordinary passenger coaches, with open platforms, etc., such bearing bracket or a bracket of equivalent construction may be supported upon the rail which is situated at the end of the platform of such cars. The housing 45, which differs somewhat from the construction illustrated in Figs. 1 and 2 of the drawings, is provided with an opening 46 in its lower end through which the brake staff 1 projects. The upper end of the housing is closed by means of a cap 47 having a depending flange 48 which fits inside of the upper end of the said housing, while the outer edge 49 of the said cap rests upon the upper end thereof. The cap 47 is provided with a central integral hollow projection 50 into which the reduced end 51 of the brake staff 1 projects and to which the said cap is secured by means of the pin 52. 10 designates a ratchet wheel having a squared or angular opening which fits upon a correspondingly shaped portion 13 at the upper end of the brake staff 1. The parts 14, 15, 16, 20, 21, 22, 23, 26, 27 and 31 correspond to the parts similarly designated in Figs. 1 to 4 of the drawing and the description thereof will not be repeated. The operation of the pawl retracting device in the two forms of construction is identical. The angular movement of the housing 45 and the parts operatively connected therewith is limited by means of stops 55 and 56 formed upon the lower side of the housing member which respectively coöperate with stationary stops 57 and 58 formed upon the bearing 40. It may be noted here that the lower ends of the stops 55 and 56 rest upon the upper edge of the bearing as is indicated in Fig. 6 of the drawing. In both forms of construction, 60 designates a handle which is pivoted at 61 to the lower edge of the laterally extending projection 14; in other words, the handle has articulated connection with its support. The handle 60 when in position to operate the brake applying mechanism extends horizontally outward as shown in full lines in the several figures of the drawing but when not in use to set the brakes depends from its pivot 61 in a substantially vertical direction parallel with the brake staff, as shown by dotted lines in Figs. 2 and 6. When it is desired by the brakeman to operate the brake actuating mechanism to set the brakes the handle is raised to its horizontal position and by exerting upon the same a rather hard pull the pawl 20 is caused to slide over the rounded corner 62 of the notch 31 and as the pawl slides over the beveled surface 27 of the pawl retracting device it moves forward under the influence of the spring into position to engage the teeth of the ratchet wheel 10 and after engagement therewith further forward movement of the handle and the housing connected therewith in the direction of the hands of a watch, away from their initial position, causes rotation of the brake staff 1 in the direction to apply the brake. Although not illustrated in the drawings of this application, it will be understood that mechanism is provided upon some stationary part of the car for holding the brake staff against rotation in a direction to release the brakes when the pawl 20 is out of engagement with the ratchet wheel 10 and also that means is provided intermediate the brake mechanism and the brake staff whereby rotation of the latter will apply the brakes. One form of mechanism of the character just described is illustrated in the drawings of my copending application filed June 21, 1912, Serial No. 704,992. The width of the stop 57 is less than the distance between the housing 45 and the pawl retracting device 26 in Figs. 5 and 6 in consequence of which when the housing 45 is rotated so that the stop 55 is brought into contact with the stop 57 the said stop 55 moves into a position between the pawl retracting device 26 and the said housing. The result of this arrangement is that the stop 57 need not be of a height greater than the pawl retracting device, as is the case in Figs. 1 and 2 of the drawings.

In Fig. 8 I have shown a construction similar to that shown in Figs. 1 to 4 and in which like figures of reference designate like parts. In this construction, however, the integral extension 24 is omitted and I have substituted for the spring 23 a spring 70 of bent metal of rectangular or other suitable section, the opposite ends of which are seated against shoulders 71 formed upon the opposite inner sides of the lateral projection 14. The central portion of the spring 70 is seated against the outer end of the pawl 20 to hold the same in engagement with the teeth of the ratchet wheel 10 when it is not retracted by the stationary retracting device 26 heretofore described or by other means which will now be described. At times, for instance when the brakeman or operator wishes to release the brakes by degrees or steps instead of permitting the same to be released by a rapid and continuous rotation of the brake staff 1, it is desirable and necessary to have means which may be controlled by the brakeman or operator for holding the pawl or such other clutch device as may be used out of engagement with the teeth of the ratchet wheel so that the brake handle and the housing and pawl may be moved angularly from their initial position in the direction of the hands of a watch either to the limit of its movement or a less distance where the pawl is released and permitted to engage the ratchet wheel. The brakeman may then release the means which normally holds the brake staff against rotation and while holding the handle permit the brake staff to rotate until the stop 38 or the stop 55 upon the housings engages the stops 36 and 37 upon the bracket. For the purpose of retracting the pawl at the will of the brakeman I have provided a manually operable lever 75 which is pivoted at 76 upon lugs 77 formed upon the upper side of the lateral projection 14. The said lever is provided with downward extensions 78 which are located upon opposite sides of the pawl 20 and are adapted to engage with the inner surfaces of the flange-like projections 79 on said pawl. To operate the said lever the brakeman takes hold of the portion 80 thereof which projects from the pivot 76 inwardly toward the axis of the brake staff 1 and depresses the same. The action of the ends of the downward extensions 78 upon the said pawl causes a retracting movement of the latter from engagement with the teeth of the ratchet 10. By securing the lever 75 upon the housing structure I have provided a very efficient and simple means which enables the brakeman or other operator to retract at will the pawl 20 or other clutch device to disengage the same from the ratchet wheel 10. It is well known that under some circumstances it is desirable in setting the brakes to rotate the brake staff away from the left or in an anti-clockwise direction; therefore, I have devised a ratchet and pawl mechanism which may be employed to rotate the brake staff either clockwise or anti-clockwise, as illustrated in Figs. 9 to 12 inclusive.

It will be observed that the general structure shown in said Figs. 9 to 12 differs but slightly from the structure shown in Figs. 5 to 7, the principal feature being that the pawl 81 as well as the ratchet wheel 10 which is removably mounted on the brake staff 1 may be inverted to the position shown in Fig. 11. As shown in Fig. 10 the substantially radial surfaces 9 of the ratchet 10 are coöperative with the pawl 81 to effect the right hand or clockwise rotation of the brake staff 1, as indicated by the arrow on said ratchet, when the handle 82 is oscillated; while in Fig. 11 the surfaces 9 of the ratchet 10 are coöperative with the pawl 81 to effect the left hand or anti-clockwise rotation of said brake staff, as indicated by the arrows on the ratchet in said figure, when the handle 82 is similarly oscillated. As best shown in Fig. 12 the pawl 81 is provided with the slots 83 and 84 in its respectively opposite edges, the rear surfaces 85 and 86 of said slots being inclined in the same direction to provide a suitable nose for engaging the notch 31 in the retracting device 26 in either position of said pawl. The pawl 81 is also provided with bearing portions 88 and 89 which are slidably supported by the cross piece 90 in the projection 14, and prevented from displacement therefrom by the depending guide lug 92. It will thus be seen that by simply inverting the ratchet and pawl a clockwise or anti-clockwise rotation of the brake staff by a similar oscillation of the brake handle is readily obtained.

Unlike the forms of construction illustrated in my said copending application, the raising and lowering of the handle 60 in the several forms of construction illustrated in this application do not affect in any way the pawl 20. Such pawl may be retracted either by the stationary pawl retracting device 26 or by means of the lever 75 but is entirely independent of the said handle.

The broad subject matter of invention disclosed herein and not claimed is claimed in my copending application referred to above.

Having thus described my invention, I claim:—

1. Brake actuating mechanism including, in combination, a brake staff, a drop handle or lever for operating the said brake actuating mechanism, clutch mechanism having connection with the said staff, stationary means for automatically rendering the said clutch mechanism inoperative when a member thereof occupies a predetermined position, and manually operable means for rendering the said clutch mechanism inoperative at the will of a brakeman or other person.

2. Brake actuating mechanism including, in combination, a brake staff, clutch mechanism having connection with the said staff, a handle or lever also having operative connection with the said brake staff which handle or lever is adapted to occupy either a substantially vertical or a horizontal position, a stationary device for automatically rendering the said clutch mechanism inoperative when a member thereof occupies a predetermined position, and manually operable means under the control of the brakeman or other person for rendering the said clutch mechanism inoperative at the will of the said brakeman or other person.

3. Brake actuating mechanism including, in combination, a brake staff, a ratchet device secured upon the said staff, a device adapted to be engaged with and disengaged from the said ratchet device, a handle or lever having operative connection with the said brake staff, which handle is adapted to occupy a substantially vertical or substantially horizontal position and is adapted for use to cause rotation of the said brake staff in one direction to apply the brakes and also for causing movement of the second-named device in the opposite direction, a stationary device for engaging the said second-named device to automatically disengage the same from the said ratchet device, and manually operable means for disengaging the said second-named device from the said ratchet device at the will of the brakeman or other person for the purpose stated.

4. Brake actuating mechanism including, in combination, a brake staff, a ratchet device secured thereto, a housing surrounding the said ratchet device and being supported upon the said brake staff, a handle or lever having connection with the said housing and being adapted to occupy a substantially vertical or a horizontal position, a pawl supported upon the said housing for enmechanism irrespective of the position of said hand lever; substantially as described.

12. In hand-operated brake actuating mechanism, a rotatable brake staff, an oscillatable hand lever embodying a pivot connection for swinging it from a non-interfering depending position to an extended position for operation, and reversible clutch mechanism adapted to convert oscillatory movements of the hand lever into unidirectional rotary movements of the brake staff in one direction or the other, a stationary member adapted to disengage the clutch mechanism and manually actuated means for withdrawing said pawl even when said hand lever is in depending position at a predetermined part of the oscillatory movement, the folding movement of said hand lever being without action on the clutch mechanism; substantially as described.

13. In hand-operated brake actuating mechanism, a rotatable brake staff, pawl and ratchet mechanism for converting the oscillatory movements into uni-directional rotary movements of the brake staff, a housing for the pawl and ratchet mechanism, a hand lever pivoted to the housing so that it can be swung from a non-interfering depending position to an extended position for oscillation thereof, and manually-operated disconnecting mechanism mounted on the housing for disengaging the pawl and ratchet mechanism at will the inward swing of said hand lever being without effect on said pawl; substantially as described.

14. In hand-operated brake actuating mechanism, a rotatable brake staff, an oscillatable hand lever capable of folding down parallel to the staff, clutch operating mechanism for converting the oscillatory movements of the hand lever into uni-directional rotary movements of the brake staff, a housing for the clutch mechanism, and manually-operated disconnecting mechanism mounted on the housing for disengaging the clutch mechanism at will, the folding movements of said hand lever being without action on the clutch mechanism; substantially as described.

15. In hand-operated brake actuating mechanism, a rotatable brake staff, pawl and ratchet mechanism for converting the oscillatory movements into uni-directional rotary movements of the brake staff, a pivoted hand lever adapted to be swung from a non-interfering depending position to an extended position for oscillating the pawl and ratchet mechanism and being without action on the pawl and ratchet mechanism when moving from its depending to its extended position, and manually-operated disconnecting mechanism for disengaging the pawl and ratchet mechanism at will; substantially as described.

16. In hand-operated brake actuating mechanism, a rotatable brake staff, a ratchet fastened on the brake staff, a housing member, a spring-pressed pawl carried by the housing member and adapted to engage the ratchet in one direction of oscillation and to disengage therefrom in the reverse direction of oscillation, in order to convert oscillatory movements of the pawl into uni-directional rotary movements of the brake staff, a hand lever pivoted to the housing member so that it can be swung from a non-interfering position to an extended working position and also being inoperative on said pawl when moving to its depending or extended positions, a stationary member cooperative with the pawl to disengage it from the ratchet at a predetermined part of the oscillatory movement, and a manually-operated disconnecting member mounted on the housing member and cooperative with the pawl to disengage it from the ratchet at will; substantially as described.

17. In hand-operated brake actuating mechanism, a rotatable brake staff, a ratchet fastened on the brake staff, a housing member, a spring-pressed pawl carried by the housing member and adapted to engage the ratchet in one direction of oscillation and to disengage therefrom in the reverse direction of oscillation in order to convert oscillatory movements of the pawl into uni-directional rotary movements of the brake staff, a hand lever pivoted to the housing member so that it can be swung from a non-interfering depending position to an extended position for oscillation thereof, a stationary member cooperative with the pawl to disengage it from the ratchet at a predetermined part of the oscillatory movement, and a manually-operated disconnecting member mounted on the housing member and cooperative with the pawl to disengage it from the ratchet at will; substantially as described.

18. In hand-operated brake actuating mechanism, a rotatable brake staff, a ratchet and a sliding pawl adapted to convert oscillatory movements into uni-directional rotary movements of the brake staff, a pivoted hand lever inoperative to release the clutch mechanism and adapted to swing from a non-interfering depending position to an extended position for oscillating the ratchet mechanism, a stationary member adapted to disengage the pawl at a predetermined part of the oscillatory movement and move it away from the staff and out of engagement with its ratchet and manually operable means for withdrawing said pawl irrespective of the position of the pivoted hand lever; substantially as described.

19. In hand-operated brake actuating mechanism, a rotatable brake staff, a ratchet fastened on the brake staff, a spring-pressed gagement with the said ratchet device, stationary means independent of the said handle or lever for engaging the said pawl to automatically disengage the same from the said ratchet device, and independent manually operable means for retracting the said pawl at the will of the brakeman or operator to disengage the said pawl from the said ratchet device for the purpose stated.

5. Brake actuating mechanism including, in combination, a brake staff, means for rotatably supporting the said staff, a housing secured upon the said brake staff, a handle or lever pivotally connected to the said housing and being adapted to occupy a substantially vertical or a horizontal position, clutch mechanism interposed between the said housing and the said brake staff whereby the said housing is rotatable with or independent of the said brake staff, a stationary device upon the means for supporting the said brake staff for contacting with a member of the clutch mechanism to automatically render the said clutch mechanism inoperative when the said housing occupies its normal position of rest, and manually operable means supported upon the said housing for rendering the said clutch mechanism inoperative at the will of the brakeman or other person.

6. Brake actuating mechanism, including a brake staff, means for rotatably supporting the said staff in proper position upon a railway car or other car, clutch mechanism having connection with the said brake staff, a handle or lever also having connection with the said brake staff and adapted to occupy either a substantially vertical or a horizontal position, a stationary device upon the said means for supporting said brake staff for automatically rendering the said clutch mechanism inoperative, and manually operable means independent of the said handle or lever and from the said stationary device for rendering the said clutch mechanism inoperative at the will of a brakeman or other person.

7. Brake actuating mechanism including, in combination, a brake staff, means for rotatably supporting said brake staff, a ratchet device secured upon the said brake staff at its upper end, a housing surrounding the said brake staff and having a hollow projection extending laterally therefrom, a device supported upon the said housing adapted to be engaged with and disengaged from the said ratchet device, a handle pivotally connected to the said lateral projection which handle is adapted to occupy either a substantially vertical or a horizontal position and which is adapted when in a horizontal position for use to cause movement of the said housing angularly with respect to the said brake staff, a stationary device upon the said means for contacting with the device to automatically disengage the same from the said ratchet device, and manually operable means for disengaging the said device upon the said housing from the said ratchet device at the will of the brakeman or other person for the purpose stated.

8. Brake actuating mechanism including, in combination, a brake staff, a reversible ratchet removably mounted thereon, a pawl coöperating with the said reversible ratchet to rotate the same in accordance with the direction of the teeth thereof, an oscillatable drop handle for causing rotation of the said brake staff and manually operable means for withdrawing said pawl irrespective of the position of said handle.

9. Brake actuating mechanism including, in combination, a brake staff, a reversible ratchet removably mounted thereon, a detent, a reversible pawl coöperating with the said ratchet and staff to cause the rotation thereof in a direction depending upon the direction of the ratchet teeth, the said pawl having slots in its opposite edges provided with inclined surfaces to provide means for engaging said detent in either of its positions, a drop handle for causing rotation of the said ratchet and the said brake staff and manually operable means for withdrawing said pawl at will.

10. In hand operated brake actuating mechanism, a rotatable brake staff, a ratchet connected to the brake staff, a pawl having duplicate cam surfaces and being adapted to engage the ratchet in one direction of oscillation and to disengage therefrom in the reverse direction of oscillation in order to convert oscillatory movements into unidirectional rotary movement of the brake staff, said pawl and said ratchet being invertible to adapt the mechanism to right-hand or left-hand operation, a stationary member adapted to engage one of the beveled surfaces of the pawl to disengage the pawl from the ratchet at a predetermined part of the oscillatory movement, a drop handle associated with said pawl and manually operable means for withdrawing said pawl irrespective of the position of said drop handle; substantially as described.

11. In hand-operating brake actuating mechanism, a rotatable brake staff, an oscillatable hand lever embodying a pivot connection for swinging it from a non-interfering depending position to an extended position for operation, and reversible clutch mechanism adapted to convert oscillatory movements of the hand lever into unidirectional rotary movements of the brake staff in one direction or the other, a stationary member adapted to disengage the clutch mechanism at a predetermined part of the oscillatory movement and manually operable means for releasing the clutch pawl adapted to move toward the brake staff to engage the ratchet in one direction of oscillation and to disengage therefrom in a reverse direction of oscillation in order to convert oscillatory movements into unidirectional rotary movements of the brake staff, a housing inclosing said ratchet and pawl, a hand lever pivoted to the housing member so that it can be swung from a noninterfering depending position to an extended position for oscillation thereof, the swinging of the hand lever being without action on the engagement of the pawl and ratchet, a stationary member coöperative with the pawl to disengage it from the ratchet at a predetermined part of the oscillatory movement and a pivoted arm for manually withdrawing said pawl; substantially as described.

20. Brake actuating mechanism including in combination a brake staff, a ratchet fastened to said staff, a housing inclosing said ratchet and adapted to swing about the same, a spring-pressed pawl mounted to slide in said housing toward and away from said shaft, an operating handle connected with said housing to swing the same, a stationary lug in position to engage said pawl at one angular position thereof, and a releasing lever pivoted to said housing and having one end projecting thereover in convenient position for depression and having its other end engaging said sliding pawl to retract the same when desired; substantially as described.

In testimony that I claim the foregoing as my invention, I have hereunto signed my name this 12th day of June, A. D. 1912.

CHARLES A. LINDSTRÖM.

In the presence of—
FRANK E. MILLER,
JOHN A. TEUFER, Jr.

It is hereby certified that in Letters Patent No. 1,120,152, granted December 8, 1914, upon the application of Charles A. Lindström, of Pittsburgh, Pennsylvania, for an improvement in "Brake-Actuating Mechanism," errors appear in the printed specification requiring correction as follows: Page 6, strike out the words "and manually actuated means for withdrawing said pawl even when said hand-lever is in depending position"; same page, line 20, as now numbered, after the word "mechanism" insert the words *and manually actuated means for withdrawing said pawl even when said hand lever is in depending position;* and that the said Letters Patent should be read with these corrections therein that the same may conform to the record of the case in the Patent Office.

Signed and sealed this 5th day of January, A. D., 1915.

[SEAL.] R. F. WHITEHEAD,
*Acting Commissioner of Patents.*